United States Patent
Menjak et al.

(10) Patent No.: US 6,933,072 B2
(45) Date of Patent: Aug. 23, 2005

(54) PARALLEL FLOW FUEL CELL

(75) Inventors: Zdravko Menjak, Troy, MI (US); Boyko Aladjov, Rochester Hills, MI (US); Srinivasan Venkatesan, Southfield, MI (US); Subhash K. Dhar, Bloomfield Hills, MI (US); Stanford R. Ovshinsky, Bloomfield Hills, MI (US)

(73) Assignee: Energy Conersion Devices, Inc., Rochester Hills, MI (US)

( * ) Notice: Subject to any disclaimer, the term of this patent is extended or adjusted under 35 U.S.C. 154(b) by 445 days.

(21) Appl. No.: 10/090,117

(22) Filed: Feb. 28, 2002

(65) Prior Publication Data

US 2003/0162074 A1 Aug. 28, 2003

(51) Int. Cl.[7] ............................. H01M 8/02; H01M 4/86
(52) U.S. Cl. ............................................ 429/40; 429/37
(58) Field of Search .......................... 429/37, 39, 42, 429/44

(56) References Cited

U.S. PATENT DOCUMENTS

| 3,597,275 | A | | 8/1971 | Winsel et al. |
| 4,246,324 | A | * | 1/1981 | de Nora et al. ............... 429/17 |
| 4,623,597 | A | | 11/1986 | Sapru et al. |
| 5,902,691 | A | * | 5/1999 | Matzkin-Bridger .......... 429/12 |

* cited by examiner

*Primary Examiner*—Gregg Cantelmo
(74) *Attorney, Agent, or Firm*—Frederick W. Mau, II; David W. Schumaker; Marvin S. Siskind

(57) ABSTRACT

A fuel cell utilizing parallel flow of a hydrogen stream, an oxygen stream, and an electrolyte solution with respect to the electrodes, while maintaining mechanical support within the fuel cell. The fuel cell contains multiple layers of electrodes which absorb and react hydrogen and oxygen. The fuel cell is designed to maintain mechanical support within the fuel cell while the electrodes expand and contract in response to the absorption of oxygen and hydrogen. The design of the fuel cell provides a substantially more compact design by not requiring space to allow for the expansion and contraction of the electrodes within the fuel cell.

66 Claims, 10 Drawing Sheets

Detail B

PARALLEL FLOW FUEL CELL

FIELD OF THE INVENTION

The present invention generally relates to fuel cells. More particularly, the present invention relates to alkaline fuel cells implementing parallel flow of hydrogen, oxygen, and electrolyte solution across the electrodes while maintaining mechanical support within the fuel cell.

BACKGROUND OF THE INVENTION

The present application discloses a fuel cell that allows for air as a source of oxygen while maintaining mechanical support within the fuel cell thereby providing a compact design while preventing damage to the electrodes. Within each fuel cell, there are a number of electrodes designed to absorb and react hydrogen and oxygen. When the electrodes absorb and react hydrogen and oxygen, they expand and contract. Over time the expanding and contracting can cause damage to the electrodes thus decreasing the life of the fuel cell. Fuel cells must also provide space to account for the expansion and contraction to prevent damage to other components of the fuel cell. In fuel cell designs, space is an important factor. Fuel cells having less space allotted to the electrode expansion have a much smaller and compact design. A smaller more compact fuel cell may find more uses than a large bulky fuel cell. A smaller and more compact fuel cell design is therefore universally beneficial. As a result of the mechanical support throughout the fuel cell, space assigned to accommodate electrode expansion was removed thereby giving the present invention a small compact design.

Fuel cells are generally designed for perpendicular flow or parallel flow of an electrolyte solution with respect to the electrodes. In the perpendicular flow fuel cells, the electrodes are porous and an electrolyte solution is forced through the electrodes. To accomplish this task, the fuel cells are operated under pressure. It is also extremely difficult to use air (21% $O_2$) as a source of oxygen in perpendicular flow fuel cells due to the amount of gas needed to flow through the electrodes. As a result, these types of fuel cells generally use pure oxygen as the oxygen source to avoid the need for an oxygen waste stream as shown in U.S. Pat. No. 3,597,275. With such fuel cells being pressurized a waste stream may cause design problems due to the pressure difference between the fuel cell and the environment. The need for a source of pure oxygen can also present problems with regard to space. Requiring a pure oxygen source means that an additional oxygen storage unit must be included in any design application. As a result a large bulky fuel cell system must be accounted for in any design application. The oxygen storage unit must also be maintained and the oxygen must be replenished, thereby adding additional cost to the operation of the fuel cell.

In parallel flow fuel cells, the electrolyte solution flows across the face of the electrodes rather than being forced through the electrodes. Inside parallel flow fuel cells, space must be allotted to allow the oxygen, hydrogen, and electrolyte solution to flow uninterrupted throughout the fuel cell. This can cause a bulky fuel cell design because of the need to include additional space to allow the hydrogen, oxygen, and electrolyte solution to flow throughout the cell and intimately contact the electrodes. One advantage to parallel flow fuel cells is that they do not require pressurized operation. Instead of the electrolyte solution needing to be forced through the electrodes, the electrolyte solution merely flows across the face of the electrodes. With the fuel cell operating at atmospheric pressure, air can be used as a source of oxygen which has many advantages.

The present invention utilizes parallel flow of an electrolyte solution with respect to the electrodes while maintaining mechanical support throughout the fuel cell. The layers of the fuel cell disclosed in the present invention are compacted tightly together. Hydrogen, oxygen, and the electrolyte solution flow uninterrupted through the compacted fuel cell by way of flow channels and/or porous spacers. The present invention provides a compacted fuel cell design while allowing for a much more economical source of oxygen.

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. application Ser. No. 09/444, 810, entitled "A Hydrogen-based Ecosystem" filed on Nov. 22, 1999 for Ovshinsky, et al., which is herein incorporated by reference and U.S. patent application Ser. No. 09/435, 497, entitled "High Storage Capacity Alloys Enabling a Hydrogen-based Ecosystem", filed on Nov. 6, 1999 for Ovshinsky et al., which is herein incorporated by reference), hydrogen will also provide a general carbon-free fuel to cover all fuel needs.

A dramatic shift has now occurred, in which the problems of global warming and climate change are now acknowledged and efforts are being made to solve them. Therefore, it is very encouraging that some of the world's biggest petroleum companies now state that they want to help solve these problems. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having a cathode, an anode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M fuel cell, the remainder of the materials of construction of the fuel cell need to be compatible with such an environment, which again adds to the cost thereof. The proton exchange membrane itself is quite expensive, and because of its low conductivity, inherently limits the power performance and operational temperature range of the P.E.M. fuel cell (the PEM is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuels cells in that they have higher operating efficiencies, they use less expensive materials of construction, and they have no need for expensive membranes. The alkaline fuel cell also has relatively higher ionic conductivity in the electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. While the conventional alkaline fuel cell is less sensitive to temperature than the PEM fuel cell, the platinum active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

In an alkaline fuel cell, the reaction at the hydrogen electrode occurs between the hydrogen fuel and hydroxyl ions (OH⁻) present in the electrolyte, which react to form water and release electrons:

$$H_2 + 2OH^- \rightarrow 2H_2O + 2e^-.$$

At the oxygen electrode, the oxygen, water, and electrons react in the presence of the oxygen electrode catalyst to reduce the oxygen and form hydroxyl ions (OH⁻):

$$O_2 + 2H_2O + 4e^- \rightarrow 4OH^-.$$

The flow of electrons is utilized to provide electrical energy for a load externally connected to the hydrogen and oxygen electrodes.

The hydrogen electrode catalyst of the alkaline fuel cell splits molecular hydrogen to atomic hydrogen. The electrocatalyst then oxidizes the atomic hydrogen to release electrons. The overall reaction can be seen as (where M is the catalyst):

$$M + H_2 \rightarrow 2MH \rightarrow M + 2H^+ + 2e^-.$$

Thus the hydrogen electrode catalyst must efficiently dissociate molecular hydrogen into atomic hydrogen. Using conventional hydrogen electrode material, the dissociated hydrogen atoms are transitional and the hydrogen atoms can easily recombine to form molecular hydrogen if they are not used very quickly in the oxidation reaction. With the hydrogen storage electrode materials of the inventive instant startup fuel cells, the atomic hydrogen is immediately captured and stored in hydride form, and then used as needed to provide power.

In addition to being catalytically efficient on both interfaces, the catalytic material must be resistant to corrosion in the alkaline electrolyte environment. Without such corrosion resistance, the electrodes would quickly lose efficiency and the cell will die.

One prior art fuel cell anode catalyst is platinum. Platinum, despite its good catalytic properties, is not very suitable for wide scale commercial use as a catalyst for fuel cell anodes, because of its very high cost. Also, noble metal catalysts like platinum, also cannot withstand contamination by impurities normally contained in the hydrogen fuel stream. These impurities can include carbon monoxide which may be present in hydrogen fuel.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the anode. The catalytic sites of the anode therefore is reduced since the overall number of available catalytically active sites is significantly lowered by poisoning. In addition, the decrease in catalytic activity results in increased over-voltage at the anode and hence the cell is much less efficient adding significantly to the operating costs. Over-voltage is the difference between the actual working electrode potential and it's equilibrium value, the physical meaning of over-voltage is the voltage required to overcome the resistance to the passage of current at the surface of the anode (charge transfer resistance). The over-voltage represents an undesirable energy loss which adds to the operating costs of the fuel cell.

In related work, U.S. Pat. No. 4,623,597 ("the '597 patent") and others in it's lineage, the disclosure of which is hereby incorporated by reference, one of the present inventors, Stanford R. Ovshinsky, described disordered multi-component hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve improved and unique results, using the Ovshinsky principles of disorder on an atomic or microscopic scale.

The present invention solves problems of current fuel cells through the use of parallel flow of the electrolyte solution with respect to the electrodes combined with mechanical support within the fuel cell. This invention provides for a compacted design allowing the use of air from the environment as a source of oxygen. The need for more economical fuel cells is always present. The present invention helps address this problem by eliminating the need for a refillable oxygen source implemented with the fuel cell. Another ongoing need in fuel cell design is to develop a more compact design reducing the space needed to install a fuel cell in particular applications. The present invention provides a more compact design by no longer needing to provide additional space to accommodate the expansion of the electrodes within the fuel cell. Since air is used, bulky oxygen storage containers no longer need to be included in any fuel cell applications as well. By providing a more compact design, the present invention may allow for more widespread use of fuel cells in many other applications.

SUMMARY OF THE INVENTION

The present invention discloses an improved fuel cell. The fuel cell of the present invention maintains mechanical support within the fuel cell and may be operated at ambient pressures. The fuel cell contains at least one hydrogen electrode pair in contact with a hydrogen stream, at least one oxygen electrode pair in contact with an oxygen stream, at least one electrolyte chamber in contact with the hydrogen electrode and the oxygen electrode. The hydrogen stream may be composed of gaseous hydrogen and the oxygen stream may be composed of pure oxygen or air from the environment. An electrolyte solution, such as potassium hydroxide, flows through the electrolyte chambers and contacts the hydrogen electrodes and the oxygen electrode. The fuel cell also contains multiple rubber compression plate used to help maintain mechanical support in the fuel cell while allowing for expansion and contraction of the electrodes.

The electrolyte chambers may be composed of a porous support structure disposed between a pair of membranes. The membranes prevent excess electrolyte solution from contacting the hydrogen electrodes and the oxygen electrode. The membranes also prevent the oxygen stream and the hydrogen stream from penetrating into the electrolyte. The porous support structure may be an expanded polymer sheet. The polymer may be of polyolefin or another rigid polymer. The electrolyte chambers contact an electrolyte contacting surface of the hydrogen electrodes and the oxygen electrodes. The electrolyte chamber is adapted to provide mechanical support within the fuel cell and provide a pathway for uninterrupted flow of the electrolyte solution throughout the fuel cell. The electrolyte chambers allow the electrolyte solution to contact the hydrogen electrodes and the oxygen electrodes.

The compression plates are adapted to absorb expansion of the hydrogen electrode and the oxygen electrode while providing mechanical support within the fuel cell. The compression plate may be comprised of rubber or another elastomeric compound capable of absorbing the expansion of the electrodes.

Each hydrogen electrode pair has a hydrogen inlet and a hydrogen outlet. The hydrogen electrode pair is made up of a first hydrogen electrode and a second hydrogen electrode. The hydrogen electrodes may be composed of an anode active material having hydrogen storage capacity. The first and second hydrogen electrodes have a hydrogen contacting surface, an electrolyte solution contacting surface, and a bulk of an active anode material. The bulk of said anode active material is disposed between the hydrogen contacting surface and the electrolyte contacting surface. The hydrogen contacting surface is adapted to dissociate and absorb gaseous hydrogen. The bulk of said anode active material is adapted to store said absorbed hydrogen. The electrolyte contacting surface is adapted to react said stored hydrogen with an electrolyte solution.

The hydrogen electrodes have multiple channels depressed into their hydrogen contacting surface. The multiple channels extend vertically and horizontally on the hydrogen contacting surface. The two hydrogen electrodes are pressed together to form the hydrogen electrode pair. When the hydrogen contacting surfaces of the hydrogen electrodes are pressed together, the multiple channels line up to form a series of flow channels between the first and second anodes. The series of flow channels are adapted to transport hydrogen across the hydrogen contacting surface of the first and second hydrogen electrodes.

The hydrogen electrodes have a deep channel on the hydrogen contacting surface extending vertically along two opposite edges of the first and second hydrogen electrodes. The deep channels form a manifold when the hydrogen contacting surfaces of the first and second anodes are pressed together. The deep channels have a conductive backing, such as nickel, to collect electrical current from the hydrogen electrode. The conductive backing is also electrically connected to the anode active material. The manifold distributes hydrogen to the series of flow channels, which distributes the hydrogen across the hydrogen contacting surface of the hydrogen electrodes.

The first and second hydrogen electrodes may comprise an anode active material layer, a porous polytetrafluoroethylene layer, and a current collector grid. The anode active material layer may be composed of a mixture of $AB_5$ type of alloy, $AB_2$ type of alloy, raney nickel, graphite, and teflon powder. The anode active material layer is disposed between the current collector grid and the polytetrafluoroethylene layer. The anode active material layer may be dispersed throughout the current collector grid. Examples of current collector grids include, but are not limited to, mesh, grid, matte, expanded metal, foil, foam and plate. The current collector grid may be composed of a conductive metal such as nickel.

Each oxygen electrode pair has an oxygen inlet and an oxygen outlet. The oxygen electrode pair is made up of a first oxygen electrode and a second oxygen electrode. The first and second oxygen electrodes have an oxygen contacting surface, an electrolyte solution contacting surface, and a bulk of a cathode active material. The bulk of the cathode active material is disposed between the oxygen contacting surface and the electrolyte contacting surface. The oxygen contacting surface is adapted to dissociate and absorb gaseous oxygen. The bulk of said cathode active material is adapted to store the absorb oxygen. The electrolyte contacting surface is adapted to react the stored oxygen with an electrolyte solution.

The first and second oxygen electrodes have multiple channels depressed into the oxygen contacting surface. The multiple channels may have a sine wave configuration depressed into the oxygen contacting surface. The multiple channels extend horizontally across the oxygen contacting surface. The oxygen contacting surfaces of the first and second oxygen electrodes are pressed together to form the oxygen electrode pair. When the oxygen electrodes are pressed together, the multiple channels line up to form a series of flow channels between the first and second oxygen electrodes. The series of flow channels are adapted to transport oxygen across the oxygen contacting surface of the first and second oxygen electrodes.

The oxygen electrodes have a deep channel on the oxygen contacting surface extending vertically along two opposite edges of each of the first and second cathodes. The deep channels form a manifold when the oxygen contacting surfaces of the first and second oxygen electrodes are pressed together. The deep channels have a conductive backing, to collect an electrical current. The conductive backing may be electrically connected to the cathode active material. The conductive backing may be composed of nickel, nickel plated copper, or another conductive metal. The manifold also distributes oxygen to the series of flow channels, which distributes the oxygen across the oxygen contacting surface of the oxygen electrodes.

The first and second oxygen electrodes are composed of a gas diffusion layer, a catalyst layer, a polytetrafluoroethylene layer, and a current collector grid. The catalyst layer is disposed between the gas diffusion layer and the current collector grid. The gas diffusion layer is disposed between the catalyst layer and the polytetrafluoroethylene layer. The polytetrafluoroethylene layer is in intimate contact with the oxygen stream. The current collector grid is in intimate contact with said electrolyte stream. The current collector grid may be a mesh, grid, matte, expanded metal, foil, foam and plate. The current collector may be composed of a conductive material such as nickel. The catalyst layer may be dispersed throughout the current collector grid. The gas diffusion layer may be composed of a mixture of polytetrafluoroethylene and carbon black. The catalyst layer may be composed of a mixture of a mixture of polytetrafluoroethylene and carbon black, additional carbon black, graphite, and silver oxide. The silver oxide may contain a lithium aluminum alloy, gallium, molybdenum, or nickel.

DETAILED DESCRIPTION OF THE INVENTION

This invention applies parallel flow of hydrogen, oxygen and electrolyte solution throughout a fuel cell while providing the cell with mechanical support. The components of the fuel cell are pressed tightly together to provide mechanical support throughout the fuel cell. While the fuel cell may be compacted together, the fuel cell allows hydrogen, oxygen, and an electrolyte solution to flow past the electrodes. Gases and liquids flow through the cell via flow channels and porous structures. The fuel cell also allows for expansion of the electrodes by using layers designed to absorb the expansion of the electrodes in the Z direction as the electrodes absorb hydrogen. This helps prevent distortion of the electrodes through bowing and expansion of the electrodes due to absorption and desorption of hydrogen.

The hydrogen, oxygen, and an aqueous alkaline electrolyte solution flow parallel to the respective electrodes throughout the fuel cell. To allow the oxygen and hydrogen to uniformly contact the electrodes, the electrodes utilize flow channels to move the oxygen and hydrogen across their face. This helps promote efficiency within the fuel cell due to a higher percentage of the oxygen and hydrogen being in direct contact with the electrodes. The flow channels also allow the oxygen and hydrogen to contact the electrodes despite the compacted design of the fuel cell. The electrodes are separated by porous chambers through which the electrolyte solution flows. The design of the chambers allow the electrolyte to flow through the fuel cell and contact the electrodes while maintaining mechanical support throughout the fuel cell.

The prior art discloses fuel cells using both parallel flow and perpendicular flow. Fuel cells of the prior art using perpendicular flow of the electrolyte solution require pressurization inside the fuel cell to force the electrolyte solution through the electrodes. Pressurization within fuel cells makes it difficult for fuel cells to use air as a source of oxygen. The difficulty arises because once the oxygen is removed from the air a mixture of nitrogen and carbon dioxide is left behind and must be disposed of. Due to the pressurization of the fuel cell, the disposal of the waste gas may require additional measures to be taken within the fuel cell. The present invention uses parallel flow of the electrolyte solution and reactant gases across the electrodes therefore pressurization within the fuel cell is not needed. With parallel flow of the electrolyte solution, the fuel cell may work at ambient pressures. Pressurization inside the fuel cell is not needed to force electrolyte through the electrodes as in perpendicular flow fuel cells. This allows the fuel cell to use air as a source of oxygen. Once the oxygen is absorbed from the air, the nitrogen and carbon dioxide can be readily disposed of through a blow off stream.

Figure 1:
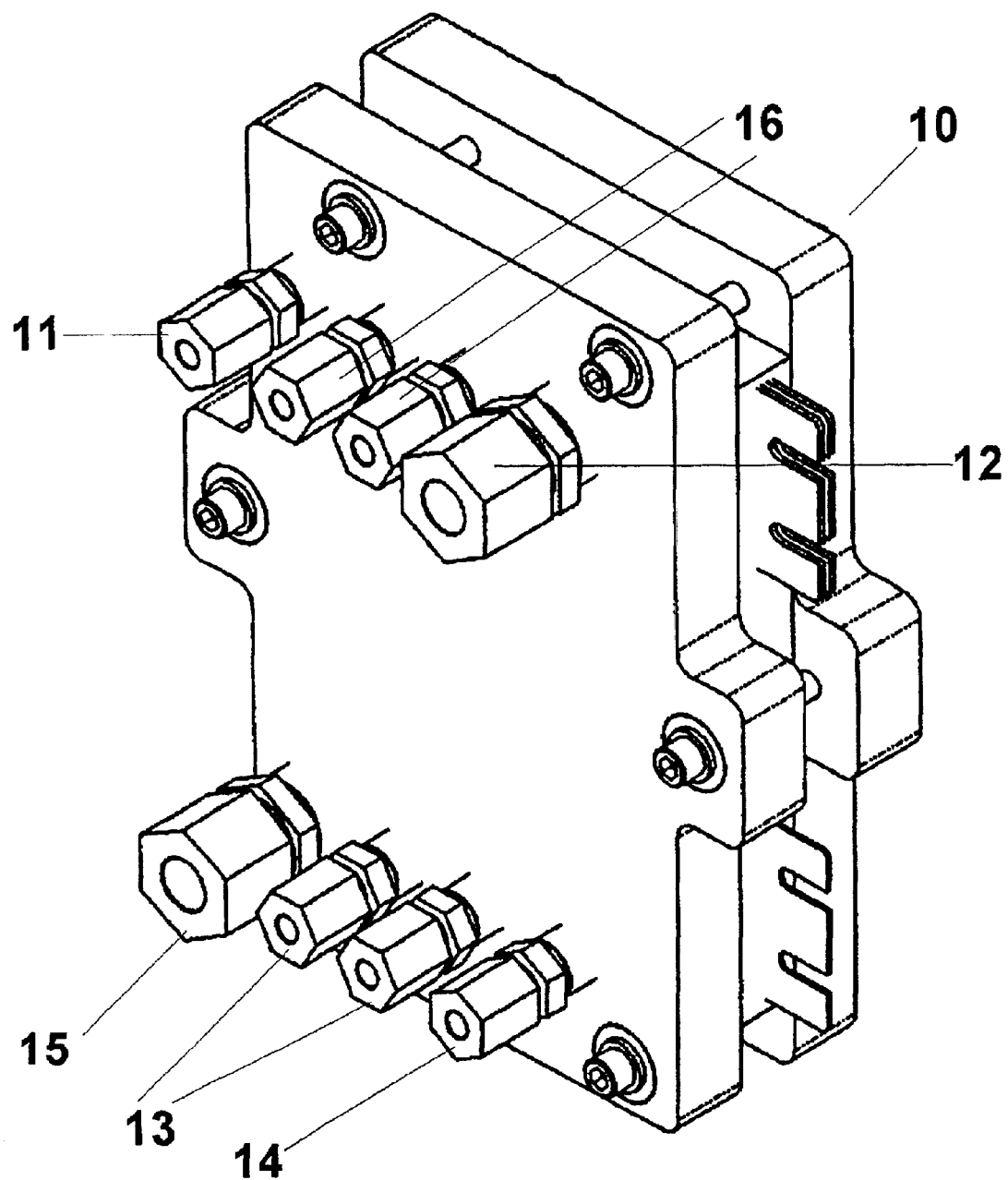
FIG. 1, shows the fuel cell of the present invention.

The fuel cell 10 of the present invention is shown in FIG. 1. Each of the layers of the fuel cell has multiple holes through which oxygen, hydrogen, and electrolyte solution flow. When the layers are stacked and pressed together, the holes of each layer line up to allow uninterrupted flow throughout the cell. The fuel cell has a hydrogen inlet 11, an oxygen inlet 12, two electrolyte inlets 13, a hydrogen outlet 14, a oxygen outlet 15, and two electrolyte outlets 16. The hydrogen flows into the fuel cell through the hydrogen inlet 11 to the hydrogen electrode pair. The hydrogen electrode pair is configured to allow the hydrogen to enter the hydrogen electrode pair and flow through the hydrogen electrode pair. Hydrogen is absorbed by the hydrogen electrode pair and the excess hydrogen flows out of the fuel cell through the hydrogen outlet 14. The excess hydrogen may be used to help remove generated heat from the fuel cell. Oxygen or an oxygen containing mixture, such as air, flows into the fuel cell through the oxygen inlet 12 to the oxygen electrode pairs. The oxygen electrode pairs are configured to allow the oxygen to enter the oxygen electrode pairs and flow through the oxygen electrode pairs. The oxygen is then absorbed by the oxygen electrode pairs. The excess oxygen then exits the fuel cell through the oxygen outlet 15. An oxygen outlet 15 may not be needed when a pure oxygen stream is used as the oxygen source. When air is used as the oxygen source, the air flows through the oxygen electrode pairs and the oxygen is absorbed from the air. The remaining nitrogen and carbon dioxide left from the air stream flow out of the fuel cell through the oxygen outlet 15. The electrolyte solution flows into the fuel cell through the electrolyte inlets 13 to the electrolyte chambers. The electrolyte solution then flows through the electrolyte chambers and contacts the hydrogen and oxygen electrode pairs. After the electrolyte solution flows past the electrodes, the electrolyte solution then flows out of the fuel cell through the electrolyte outlets 16.

Figure 3:
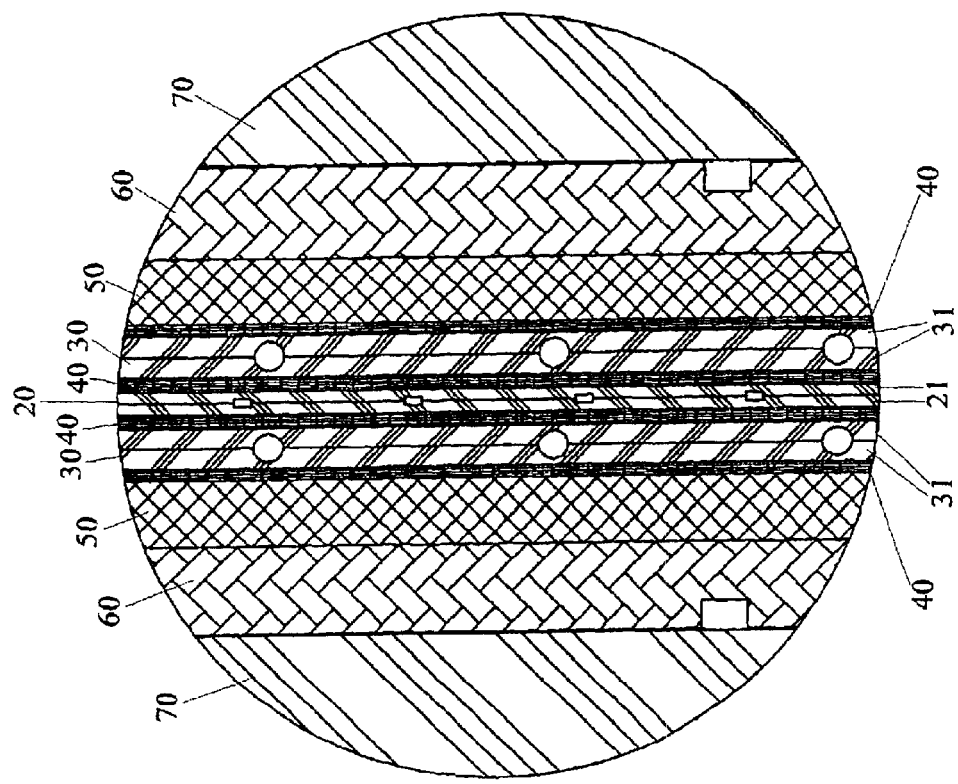
FIG. 3, shows a magnified cross sectional view of the fuel cell of the present invention as shown in FIG. 2.
Figure 2:
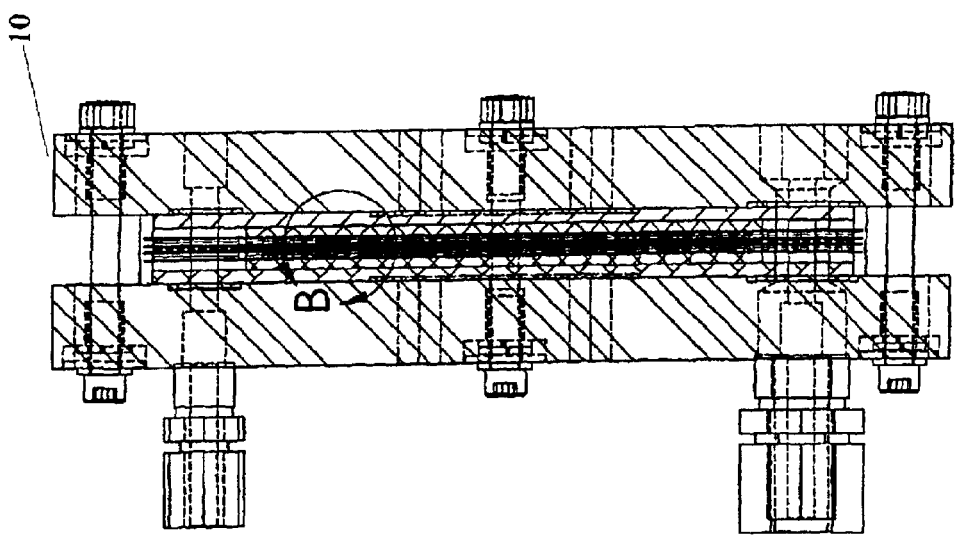
FIG. 2, shows a side view of the fuel cell of the present invention.
Figure 4:
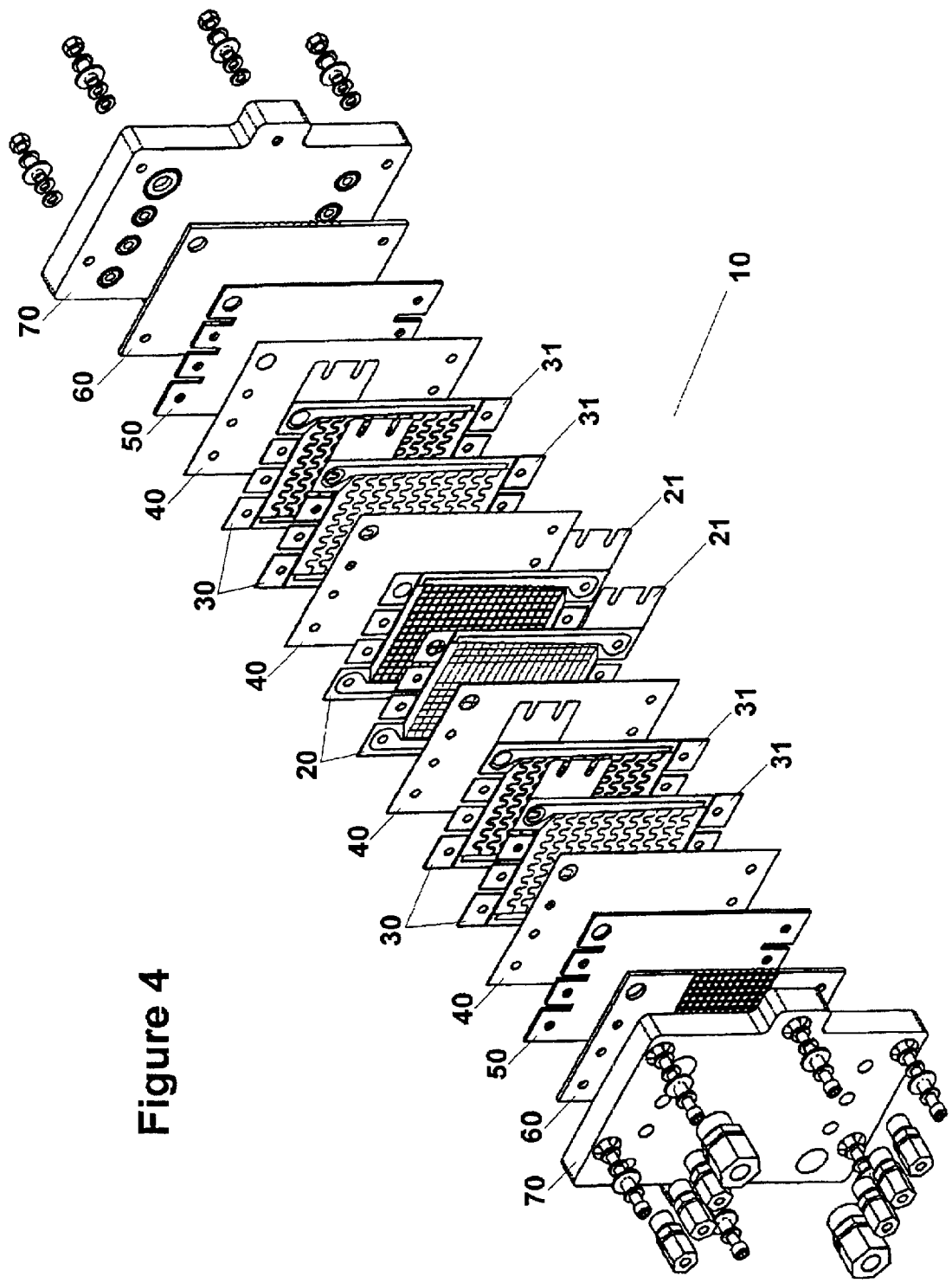
FIG. 4, shows an exploded view of the fuel cell of the present invention.
Figure 5:
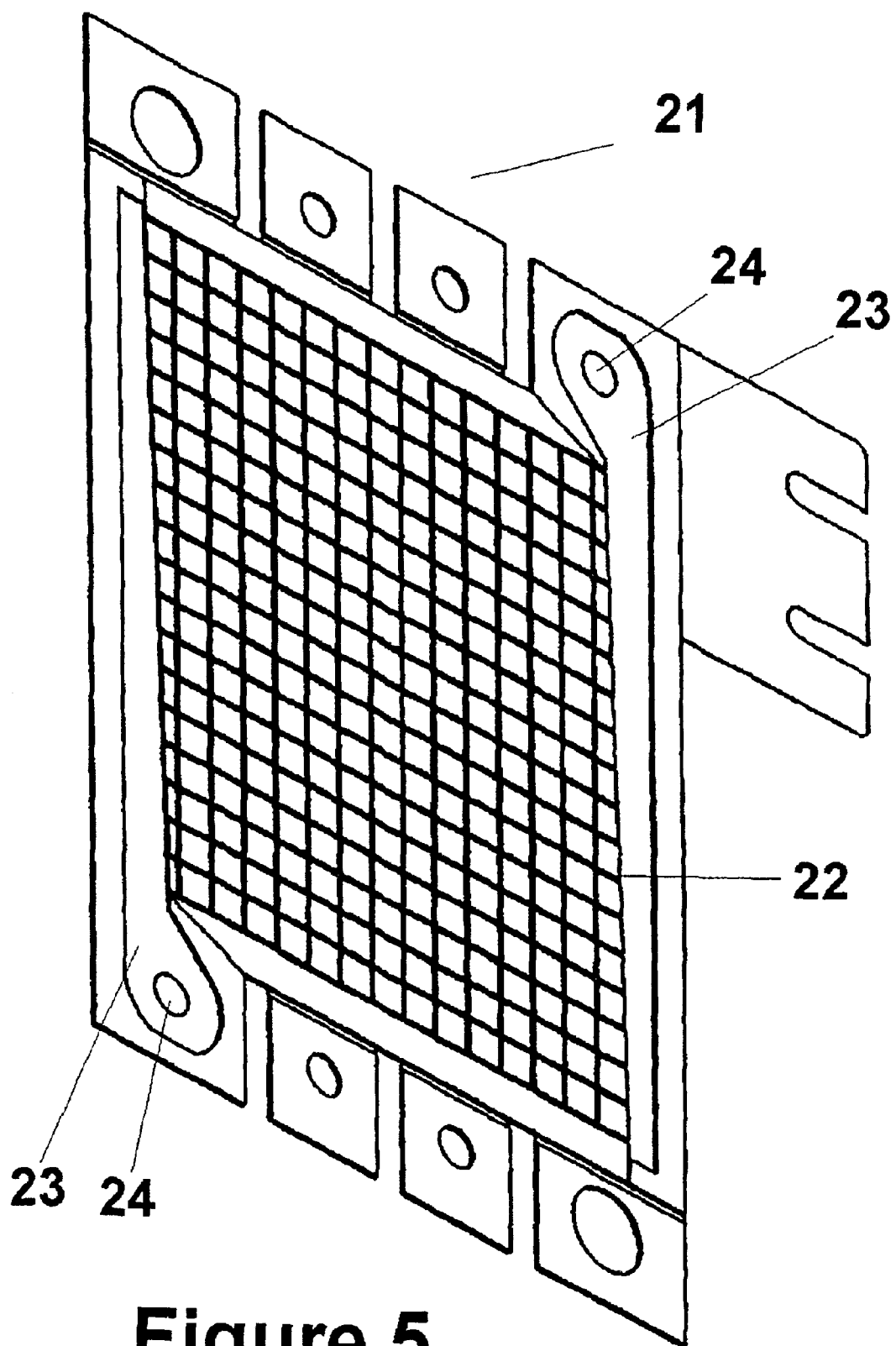
FIG. 5, shows a detailed view of a hydrogen electrode in accordance with the present invention.

A side view of the fuel cell is shown in FIG. 2. A cross-sectional view of the fuel cell of FIG. 2 is shown in FIG. 3 and an exploded view of the fuel cell of FIG. 2 is shown in FIG. 4. The fuel cell has a stack formation with multiple layers. The fuel cell contains at least one hydrogen electrode pair 20. The hydrogen electrode pair 20 is formed from two hydrogen electrodes 21 pressed together. Electrolyte chambers 40 are placed on each side of the hydrogen electrode pair 20. Oxygen electrode pairs 30 are placed in contact with each electrolyte chamber 40 on the side opposite the hydrogen electrode pair 20. The oxygen electrode pairs 30 are each formed from two oxygen electrodes 31 pressed together. Additional electrolyte chambers 40 may be optionally placed on the other side of the oxygen electrode pairs 30. Rubber compression plates 50 are placed on the outside of the outermost electrolyte chambers 40. Electrode end plates 60 are placed outside the rubber compression plates 50. Big end plates 70 are placed on the outside of the electrode end plates 60 to complete the stack. The big end plates are bolted together and provide mechanical support and compression to the fuel cell.

The fuel cell is easily expandable by addition of more layers as dictated by design requirements. In such case additional hydrogen electrode pairs, oxygen electrode pairs, and electrolyte chambers may be added. The layers must be positioned as earlier described with respect to one another for operation of the fuel cell.

Each fuel cell contains at least one pair of hydrogen electrodes 21 which form the hydrogen electrode pair 20. A more detailed view of an anode in accordance with the present invention is shown in FIG. 3. The hydrogen electrodes 21 may be composed of a hydrogen storage alloy. The pair of hydrogen electrodes 21 are pressed together to create uniform contact between the hydrogen electrodes 21 thereby promoting optimum absorption of hydrogen into the hydrogen electrodes 21. The hydrogen electrodes 21 are substantially rectangular in shape. Each individual hydrogen electrode 21 has multiple channels 22 running vertically and horizontally along the hydrogen contacting surface of the hydrogen electrode 21. The hydrogen electrodes 21 are pressed together to form the hydrogen electrode pair 20. When the hydrogen electrodes 21 are pressed together, the channels 22 line up and form a series of flow channels disposed between the hydrogen electrodes 21. Other channel designs may be used provided that the channels line up to form flow channels when the hydrogen electrodes are pressed together. Hydrogen then flows through the flow channels and is readily absorbed into the hydrogen electrodes 21. The design of these flow channels allow for substantial hydrogen flow parallel to the hydrogen electrodes 21 while mechanical support is maintained within the fuel cell 10. The design also allows for uniformity throughout each hydrogen electrode pair 20. The workload of the hydrogen electrode pair 20 is thereby optimized.

Porous sheets may also be used instead of the flow channels. In such case, the porous sheet will be placed between the hydrogen electrodes and allow hydrogen to flow across the hydrogen electrodes. Preferable porous sheets are comprised of an expanded polyolefin material or extruded biplanar netting, however other materials may be used provided they are able to withstand the environment within the fuel cell.

Each hydrogen electrode also has a single deep channel 23 running vertically along two opposite edges of the hydrogen electrode 21. The deep channels may have a conductive backing. The conductive backing may be composed of nickel or another conductive metal. The conductive backing may be electrically connected to the anode active material within the electrode (possibly via the conductive support). The conductive backing aids the fuel cell in current collection. One channel is at its widest point at the bottom of the hydrogen electrode 21 and at its narrowest point at the top of the hydrogen electrode 21 and the other channel is at its widest point at the top of the hydrogen electrode 21 and at its narrowest point at the bottom of the hydrogen electrode 21. At the wide points of each channel, a hole 24 is placed in the hydrogen electrode 21. When the hydrogen electrodes are pressed together to form the hydrogen electrode pair 20, the deep channels 23 line up and form manifolds on both edges of the hydrogen electrode pair 20 extending vertically along the edge of the hydrogen electrode pair 20. The holes 24 in each deep channel 23 thereby form a hydrogen inlet and outlet for the hydrogen electrode pair 20. Hydrogen enters the hydrogen electrode pair 20 through the hole at the top of the hydrogen electrode pair and exits through the hole at the bottom of the hydrogen electrode pair. Hydrogen is thereby evenly distributed to the flow channels and across each hydrogen electrode 21 by the manifolds.

Figure 6:
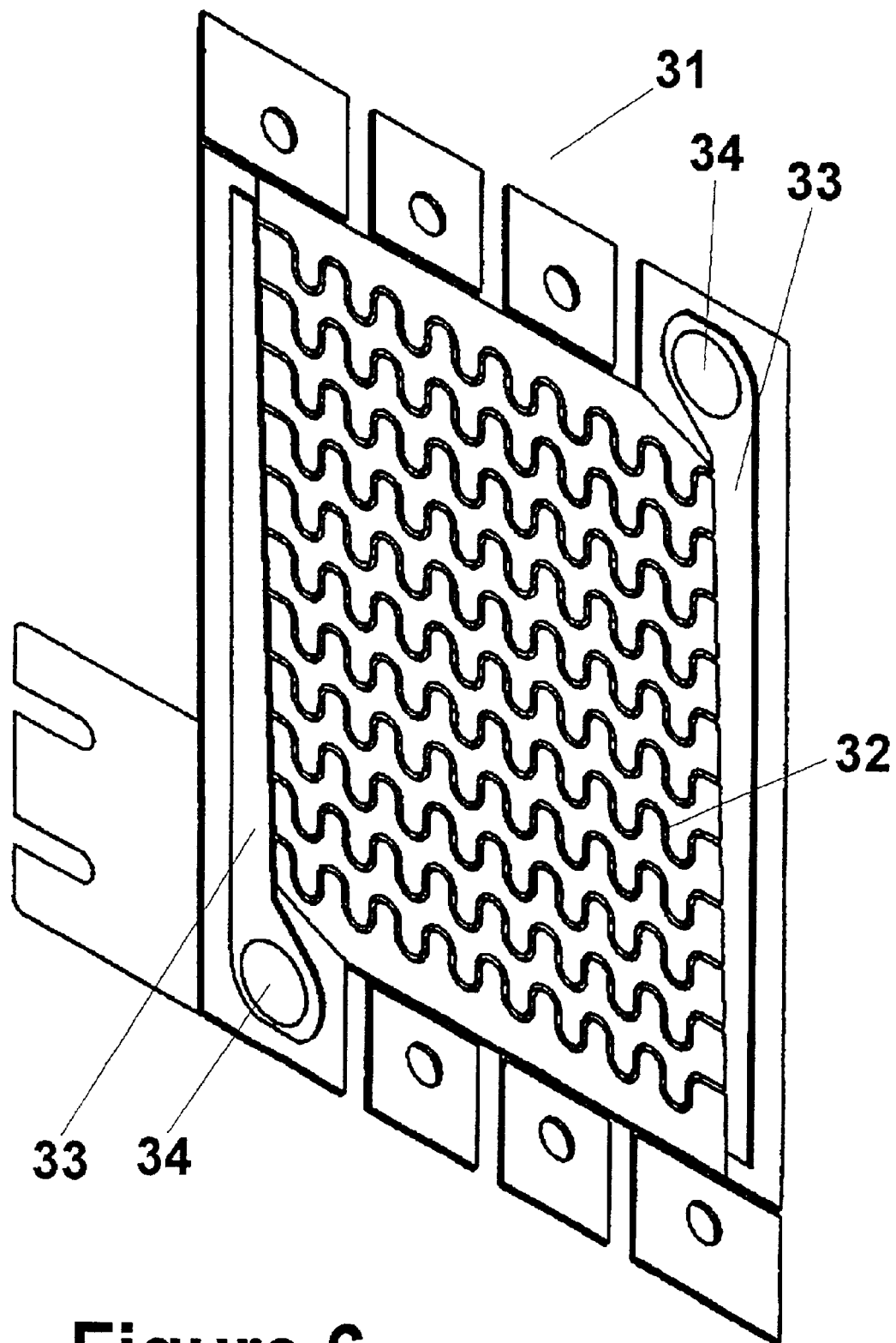
FIG. 6, shows a detailed view of an oxygen electrode in accordance with the present invention.

Each fuel cell also contains at least two pairs of oxygen electrodes 31 which form the oxygen electrode pairs 30. A more detailed view of a cathode in accordance with the present invention is shown in FIG. 6. The oxygen electrodes 31 are pressed together to create uniform contact between the oxygen electrodes 31 thereby promoting optimum absorption of oxygen into the oxygen electrodes 31. The oxygen electrodes 31 are substantially rectangular in shape. Each oxygen electrode 31 has a plurality of channels 32 on the oxygen contacting surface of the oxygen electrode 31. The channels 32 have a wave shape and run horizontally across the oxygen contacting surface 31. The oxygen electrodes 31 are pressed together to form the oxygen electrode pairs 30. When each pair of oxygen electrodes 31 are pressed together, the channels 32 line up and form a series of wave shaped flow channels disposed between the oxygen electrodes 31. Other channel designs may be used provided that the channels line up to form flow channels when the oxygen electrodes are pressed together. Oxygen then flows through the flow channels and is readily absorbed into the oxygen electrodes 31. The design of these flow channels allow for substantial oxygen flow parallel to the oxygen electrodes 31 while mechanical support is maintained within the fuel cell 10. The design also allows for uniformity throughout each oxygen electrode pair 30. The workload of each oxygen electrode pair 30 is thereby optimized.

Porous sheets may also be used instead of the flow channels. In such case, the porous sheet will be placed between the oxygen electrodes and allow oxygen to flow across the oxygen electrodes. Preferable porous sheets are comprised of an expanded polyolefin material or extruded biplanar netting, however other materials may be used provided they are able to withstand the environment within the fuel cell.

Each oxygen electrode 31 also has a single deep channel 33 running vertically along both edges of the oxygen electrode 31. The deep channels may have a conductive backing. The conductive backing may be composed of nickel or another conductive metal. The conductive backing may be electrically connected to the cathode active material within the electrode. The conductive backing aids the fuel cell in current collection. One deep channel 33 is at its widest point at the bottom of the oxygen electrode 31 and at its narrowest point at the top of the oxygen electrode 31 and the other channel is at its widest point at the top of the oxygen electrode 31 and at its narrowest point at the bottom of the oxygen electrode 31. At the wide points of each deep channel 33, a hole 34 is placed in the oxygen electrodes 31. When the cathodes are pressed together to form the oxygen electrode pair 30, the channels line up and form manifolds on two opposite edges of the oxygen electrode pair 30 extending vertically along the oxygen electrode pair 30. The holes 34 in each deep channel 33 thereby form oxygen inlets and outlets for the oxygen electrode pair 30. Oxygen enters the oxygen electrode pair 30 through the hole at the top of the electrode and exits through the hole at the bottom of the electrode. Oxygen is thereby evenly distributed to the flow channels across each oxygen electrode 31 through the manifolds.

Figure 7:
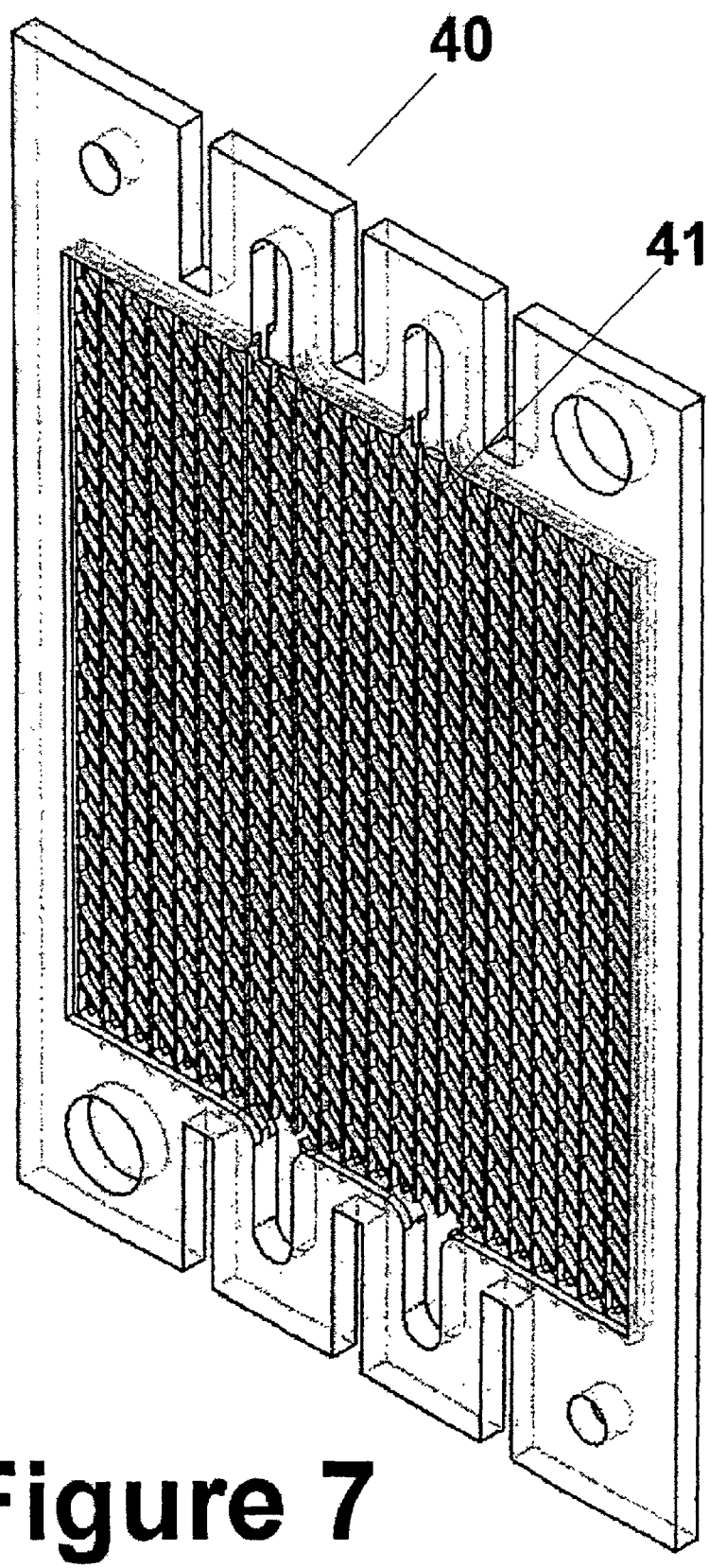
FIG. 7, shows a detailed cross sectional view of the electrolyte chamber in accordance with the present invention.

Electrolyte chambers may be used to maintain mechanical support within the fuel cell while providing a pathway for the electrolyte solution flow throughout the fuel cell. A more detailed view of an electrolyte chamber in accordance with the present invention is shown in FIG. 7. The electrolyte chambers 40 allow the electrolyte solution to contact the hydrogen electrodes and the oxygen electrodes. The electrolyte chambers may be composed of an expanded polyolefin sheet 41 having a thin membrane on each side. The membrane helps prevent excess electrolyte from contacting the electrode and also prevents hydrogen or oxygen from penetrating into the electrolyte solution. Electrolyte chambers 40 may be placed on both sides of each electrode in fuel cell. The electrolyte chambers may also be shared between electrodes. The electrolyte chambers may be in direct contact with the electrodes. The electrolyte solution enters the fuel cell and flows through the electrolyte chamber. After passing through the electrolyte chamber, the electrolyte solution flows out of the fuel cell. While the electrolyte chamber is preferably constructed from an expanded polyolefin sheet, any porous material that allows unrestricted flow throughout its structure while maintaining mechanical support of the fuel cell may be substituted. The porous material must also be one that does not react with the alkaline electrolyte solution and must be able to withstand the operating temperatures of the fuel cell.

Rubber compression plates are inserted into the fuel cell to absorb volumetric expansion of the fuel cell and help maintain mechanical support of the fuel cell stack. The rubber compression plates are located between the end plates and the outer electrolyte chambers, however more rubber compression plates may be added to comply with design requirements. The rubber compression plates are designed to absorb expansion of the electrodes in the Z direction as the electrodes expand and contract as hydrogen and oxygen are absorbed and reacted by the respective electrodes. The rubber compression plates may be constructed from any rubber type material, however the rubber material must not be reactive with the alkaline electrolyte solution and must be able to withstand the operating temperatures of the fuel cell.

The hydrogen electrodes may be generally composed of an anode active material having hydrogen storage capacity. The anode active material is designed to have a high density of active catalytic sites, resistance to poisoning, and long operating life to provide efficient low cost fuel cell operation.

An anode active material of the instant invention may be a composite of a hydrogen storage material and an additional catalytic material. The preferable anode active material is one which can reversibly absorb and release hydrogen irrespective of the hydrogen storage capacity and has the properties of a fast hydrogenation reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metal alloys, zirconium and/or titanium alloys or mixtures thereof. The anode material may even be layered such that the material on the hydrogen contacting surface is formed from a material which has been specifically designed to be highly catalytic to the dissociation of molecular hydrogen into atomic hydrogen, while the material on electrolyte contacting surface is designed to be highly catalytic to the formation of water from hydrogen and hydroxyl ions.

Certain hydrogen storage materials are exceptionally useful as alkaline fuel cell anode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the anode; and 2) as an internal hydrogen storage buffer to insure that a ready supply of hydrogen atoms is always available at the electrolyte contacting surface.

Specific alloys useful as the anode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloys provide powder particles having an enriched Ni surface. The most preferred alloys having enriched Ni regions are alloys having the following composition:

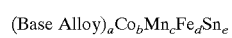

$$(\text{Base Alloy})_a Co_b Mn_c Fe_d Sn_e$$

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent. Such materials are disclosed in U.S. Pat. No. 5,536,591 to Fetcenko et al., published Jul. 16, 1996, the disclosure of which is hereby incorporated by reference.

Figure 8:
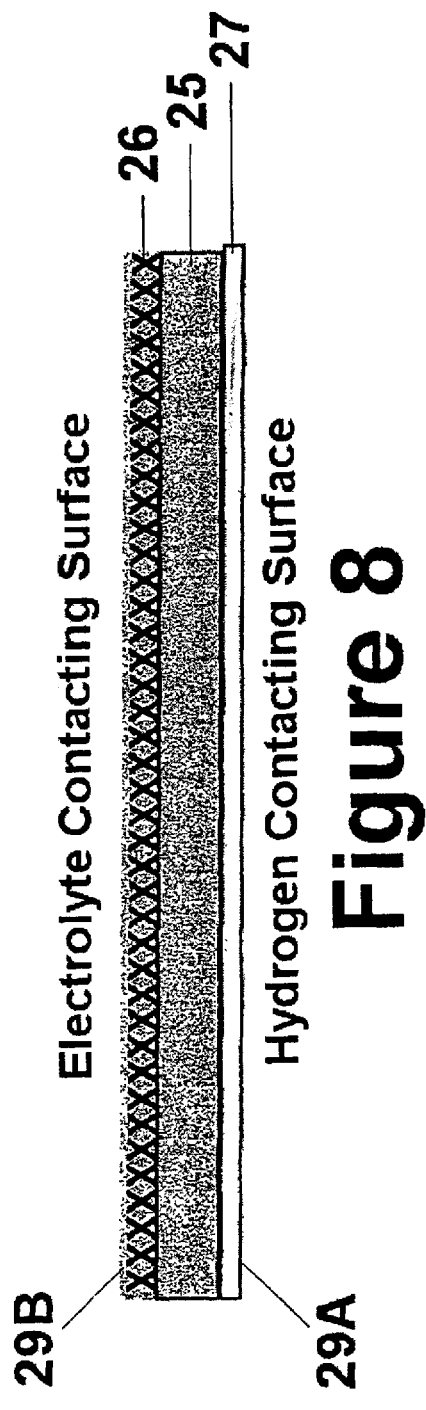
FIG. 8, shows a cross sectional view of the preferred embodiment of the anode in accordance with the present invention.

The hydrogen electrodes in the preferred embodiment of the present invention have a layered structure and are shown in FIG. 8. The layered structure promotes hydrogen dissociation and absorption within the hydrogen electrode 21. Each hydrogen electrode 21 is composed of an active material layer 25, a current collector grid 26, and a porous polytetrafluoroethylene layer 27. The active material layer 25 is disposed between the current collector grid 26 and the polytetrafluoroethylene layer 27. The active material layer 25 may be dispersed throughout the current collector grid 26. Examples of current collector grids include, but are not limited to, mesh, grid, matte, expanded metal, foil, foam and plate. The current collector grid may be composed of a conductive material such as nickel. Other conductive materials may be substituted as required by design constraints. The polytetrafluoroethylene layer 27 may be approximately 0.0007 inches thick. The current collector grid 26 is on the electrolyte contacting side of the hydrogen electrode 21 and the polytetrafluoroethylene layer 27 is on the hydrogen contacting side of the hydrogen electrode 21.

The active material layer 25 may be composed of Misch metal nickel alloy, Raney nickel, graphite, and polytetrafluoroethylene powder. A preferred composition of the active material layer 25 is by weight 35% Mischmetal nickel alloy, 46% Raney nickel, 4% graphite, and 15% polytetrafluoroethylene. The most preferred Misch metal nickel alloy has the following composition by weight percent:
50.07% Ni, 10.62% Co, 4.6% Mn, 1.8% Al, 20.92% La, 8.63% Ce, 0.87% Pr, and 2.49% Nd. The graphite may be one with isotropic shape having high electrical and thermal conductivity. A typical example of such graphite is called TIMREX KS-75 (Trademark of Timcal Group). Raney nickel and polytetrafluoroethylene are well known in the art and do not need any further discussion.

The oxygen electrodes may contain an active material component which is catalytic to the dissociation of molecular oxygen into atomic oxygen, catalytic to the formation of hydroxyl ions (OH$^-$) from water and oxygen ions, corrosion resistant to the electrolyte, and resistant to poisoning. A material useful as an active material in the oxygen electrode is on a host matrix including at least one transition metal element which is structurally modified by the incorporation of at least one modifier element to enhance its catalytic properties. Such materials are disclosed in U.S. Pat. No. 4,430,391 ('391) to Ovshinsky, et al., published Feb. 7, 1984, the disclosure of which is hereby incorporated by reference. Such a catalytic body is based on a disordered non-equilibrium material designed to have a high density of catalytically active sites, resistance to poisoning and long operating life. Modifier elements, such as La, Al, K, Cs, Na, Li, Ga, C, and O structurally modify the local chemical environments of the host matrix including one or more transition elements such as Mn, Co and Ni to form the catalytic materials of the cathode. These low over-voltage, catalytic materials increase operating efficiencies of the fuel cells in which they are employed.

The oxygen electrode may be formed the same as conventional oxygen electrodes which use platinum catalysts, but the non-noble-metal catalysts described above are substituted for the platinum. The non-noble catalysts are finely divided and disbursed throughout a porous carbon matte-like material. The material may or may not have a conductive substrate as needed.

The fuel cell cathodes of this invention may also utilize redox couples, particularly metal/oxides couples selected from the group of metals consisting of copper, silver, zinc, cobalt and cadmium. These types of oxygen electrodes are discussed in detail in the commonly owned U.S. Pat. No. 6,620,539, the disclosure of which is hereby incorporated by reference.

The oxygen electrodes of the instant invention may also include a catalytic material which promotes and speeds the dissociation of molecular oxygen into atomic oxygen (which reacts with the redox couple). A particularly useful catalyst is carbon. This carbon should be very porous and may be electrically conductive.

The oxygen electrode also needs a barrier means to isolate the electrolyte, or wet, side of the cathode from the gaseous, or dry, side of the cathode. A beneficial means of accomplishing this is by inclusion of a hydrophobic component comprising a halogenated organic compound, particularly polytetrafluoroethylene (PTFE) within the electrode.

The oxygen electrodes, may also include a current collector or current collecting system extending within said active material. The current collector may comprise an electrically conductive mesh, grid, foam or expanded metal. The choice of such collection systems may be made according to electrode manufacturing or production system needs.

Figure 9:
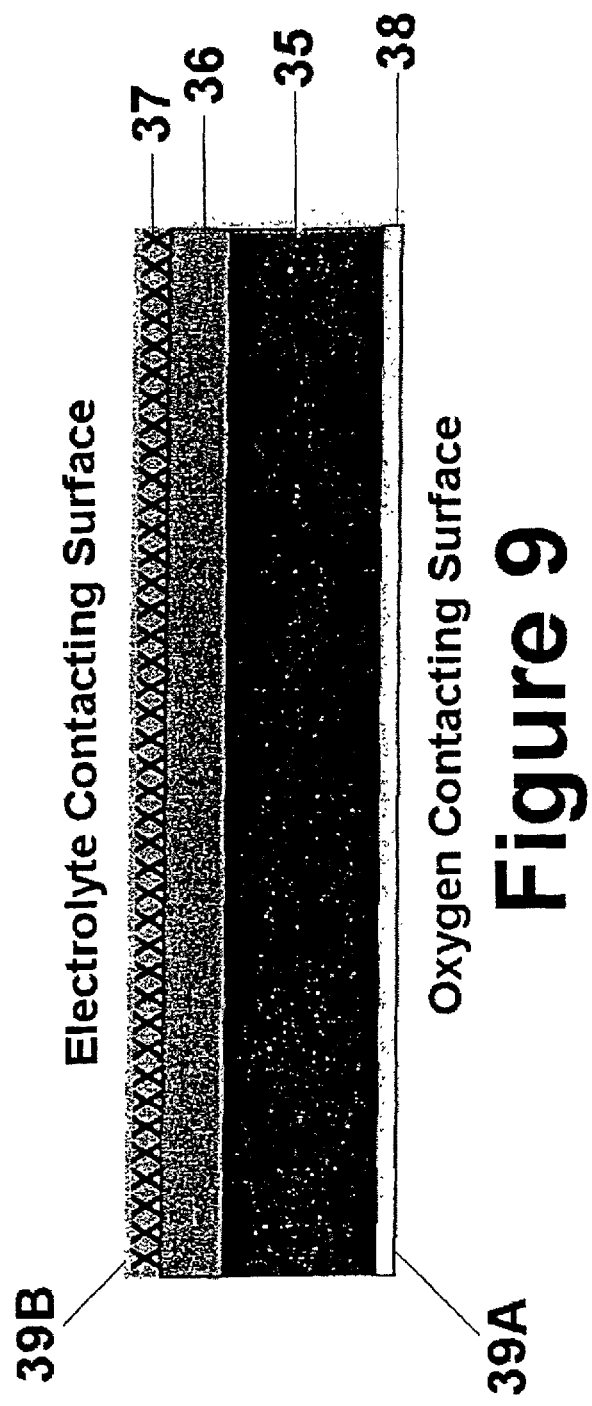
FIG. 9, shows a cross sectional view of the preferred embodiment of the cathode in accordance with the present invention.

The oxygen electrodes in the preferred embodiment of the present invention have a layered structure and are shown in FIG. 9. The layered structure promotes oxygen dissociation and absorption within the oxygen electrode 31. Each oxygen electrode 31 is composed of an A layer 35, a B layer 36, a current collector grid 37, and a polytetrafluoroethylene layer 38. The A layer 35 may be composed of carbon particles coated with polytetrafluoroethylene. The carbon particles may be carbon black known as Vulcan XC-72 carbon (Trademark of Cabot Corp.), which is well known in the art. The A layer 35 may contain approximately 40 percent by weight polytetrafluoroethylene with the remainder consisting of carbon particles. The B layer 36 may be composed of the A layer material 35 and additional carbon particles, graphite and silver oxide. The B layer 36 may contain approximately 50 percent of the material of the A layer 35, 15 percent carbon, 15 percent graphite and 20 percent silver oxide. The carbon added to the B layer 36 is carbon black known as Black Pearls 2000 (Trademark of Cabot Corp.). The graphite is preferably TIMREX SFG 44 graphite (Trademark of Timcal Group). The silver oxide may also contain a lithium-aluminum alloy, gallium, or other modifiers for improved performance.

Reactive elements such as lithium may be added to the redox couple in the form of a non-reactive alloy such as a LiAl alloy. That is, lithium alone as an individual element is extremely reactive with oxygen and water vapor, therefore it is advisable to incorporate the element into the redox couple in the form of an alloy with aluminum which is not reactive in this way. Other elements which may be alloyed with the lithium include boron and silicon. Specifically the LiAl alloy is a 50:50 At. % alloy. Ga may also be added to the silver oxide. Specific examples of silver oxides containing an Li—Al alloy or Ga are shown in Table 1.

TABLE 1

| Sample Description | Analysis (ICP for 1–6; EDS rest) |
|---|---|
| 5% LiAl, 95% Ag from nitrates | Li:0.006%, Al:0.07%, Ag:99.924% |
| 1% LiAl, 99% Ag from alloy | Li:0.001, Ag 99.999% |
| 10% LiAl, 90% Ag from alloy | Li:0.82%, Al:5.16%, Ag:94.02 |
| 5% LiAl, 95% Ag from alloy | Li:0.034%, Al:0.29%, Ag:99.676% |
| LiAl, Ag | Ag:100% |
| 1% Ga, 99% Ag | Ag:100% |
| 5% Ga, 95% Ag | Ga:0.7%, Ag:99.3% |

The current collector grid 37 is placed on top of the B layer 36 which is placed on top of the A layer 35. The B layer 36 may be dispersed throughout the current collector grid 37. Examples of current collector grids include, but are not limited to, mesh, grid, matte, expanded metal, foil, foam and plate. The current collector grid 37 may be composed of a conductive material such as nickel. Other conductive materials may be substituted as required by design constraints. The other side of the A layer 35 is coated with a film of polytetrafluoroethylene 38. The nickel wire mesh 37 is in contact with the electrolyte solution and the polytetrafluoroethylene layer 38 is in contact with the oxygen stream.

Figure 10:
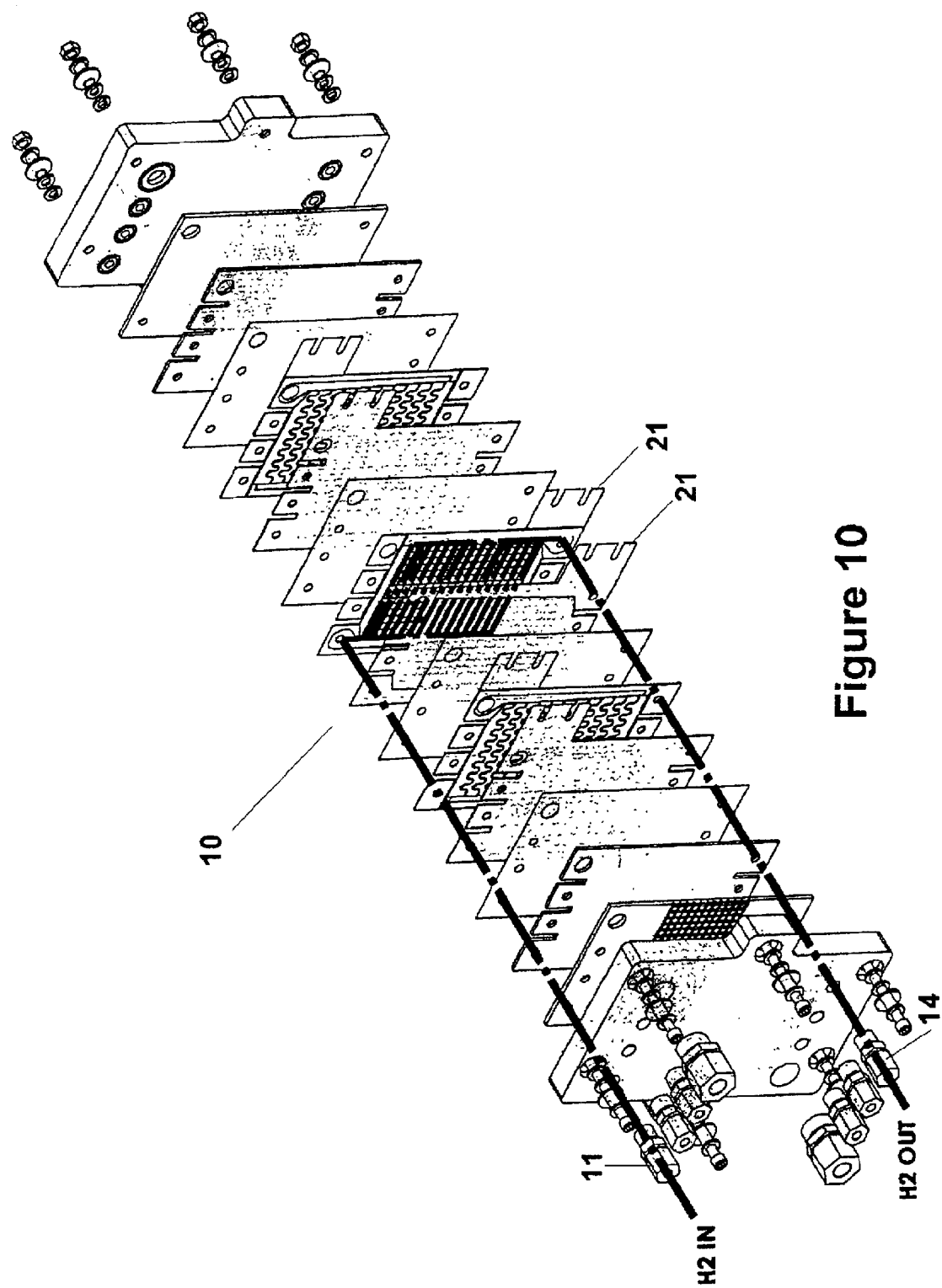
FIG. 10, is an exploded view of the fuel cell of the present invention, specifically shown is the flow of hydrogen through the fuel cell.

The flow of hydrogen through the fuel cell is shown in FIG. 4 10. In the hydrogen electrode section, hydrogen or hydrogen containing gas mixtures is supplied to the hydrogen electrodes 21 through the hydrogen inlet 11. Hydrogen is transported between the hydrogen electrodes 21 and is absorbed through the hydrogen contacting surface 29A into the hydrogen electrode 21. The absorbed hydrogen is catalytically broken down by the anode active material 25 into atomic hydrogen which is stored in the hydrogen storage material as a hydride. The stored atomic hydrogen then finally reacts at surface 29B with hydroxyl ions to form water. It should be noted that the heat of hydride formation may help to warm the fuel cell to it's optimal operating temperature. Any unabsorbed hydrogen and other contaminant gases or water vapor in the hydrogen supply are vented through the hydrogen outlet 14. The vented gases may be recycled if enough hydrogen is present to warrant recovery. Otherwise the hydrogen may be used to provide a source of thermal energy if needed for other components such as a hydride bed hydrogen storage tank.

Figure 11:
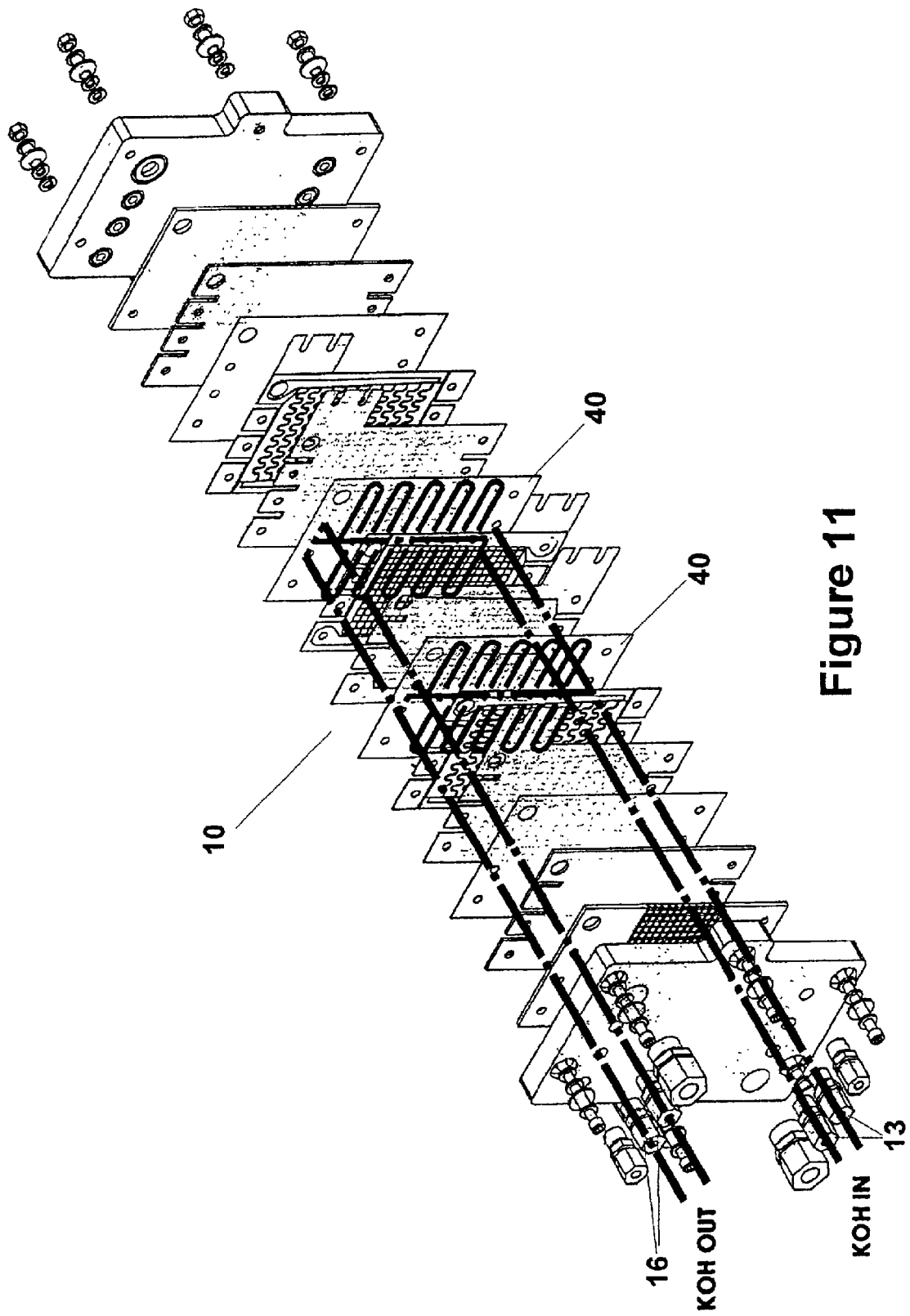
FIG. 11, is an exploded view of the fuel cell of the present invention, specifically shown is the flow of electrolyte solution through the fuel cell.

The flow of the electrolyte solution through the fuel cell is shown in FIG. 11. The electrolyte solution is an aqueous alkaline electrolyte in intimate contact with the electrolyte contacting surfaces of hydrogen electrodes 21 and the oxygen electrodes 31. The alkaline solution is well known in the art and is typically a potassium hydroxide solution. The electrolyte solution is supplied to the porous electrolyte chambers through electrolyte solution inlets 13. The electrolyte solution flows through the porous electrolyte chamber 40 and contacts the electrolyte contacting surfaces of the hydrogen electrodes and the oxygen electrodes. The electrolyte provides hydroxyl ions which react with hydrogen ions at the electrolyte contacting surface 29B of the hydrogen electrode 21 and water molecules which react with oxygen ions at the electrolyte contacting surface 39B of the oxygen electrode 31. The electrolyte is circulated through the fuel cell via inlets 13 and outlets 16 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any loses due to evaporation of water through the electrodes. Systems for conditioning the fuel cell electrolyte are well known in the art and need not be further described in detail herein.

Figure 12:
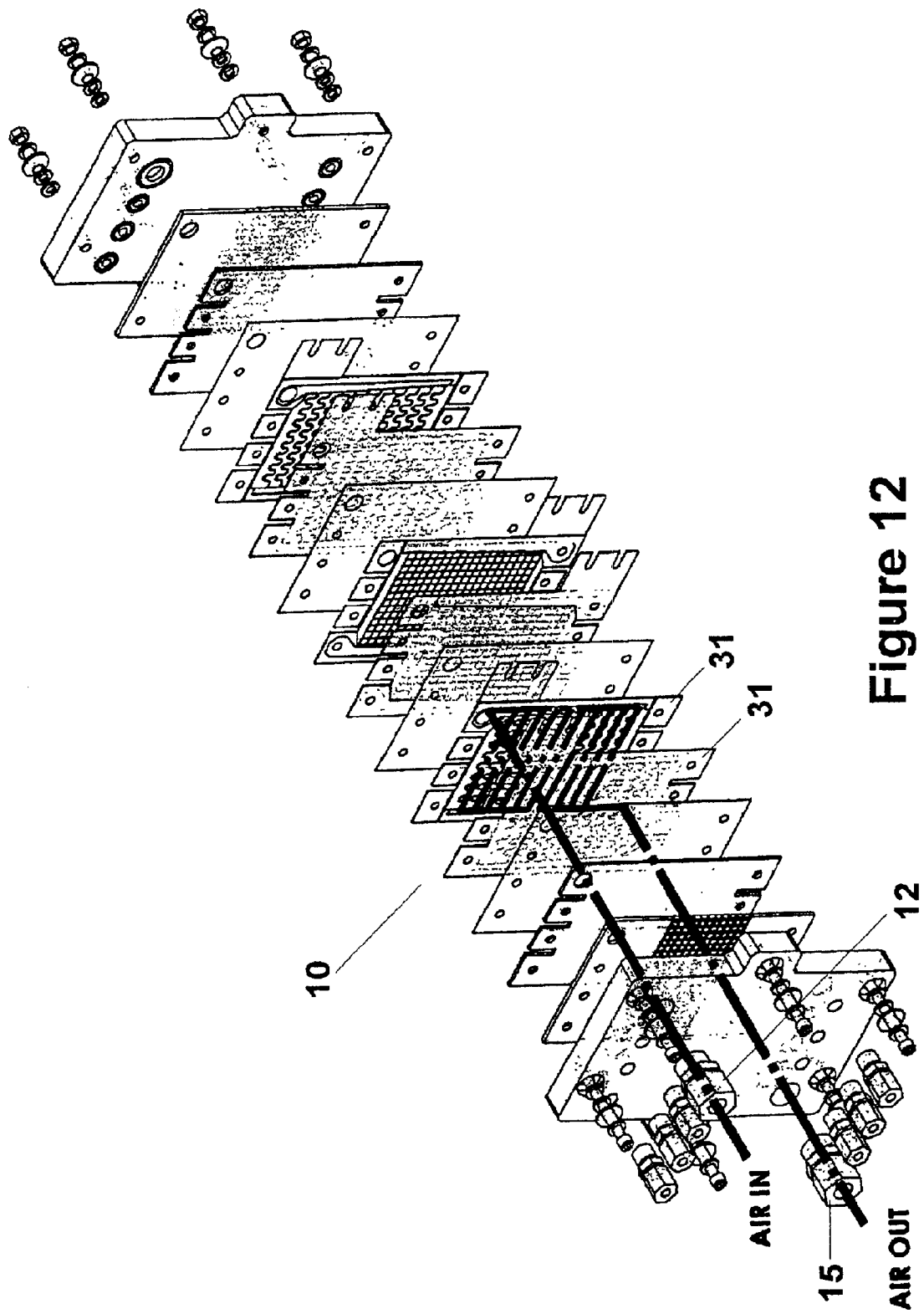
FIG. 12, is an exploded view of the fuel cell of the present invention, specifically shown is the flow of oxygen through the fuel cell.

The flow of oxygen through the fuel cell is shown in FIG. 12. In the oxygen electrode section, oxygen, air, or some other oxygen containing gaseous mixture is supplied to the oxygen electrodes 31 through oxygen inlet 12. Oxygen is then absorbed through the oxygen contacting surface 39A into the oxygen electrode 31. The absorbed oxygen is catalytically broken down by the cathode active material into ionic oxygen. The ionic oxygen then reacts at the electrolyte contacting surface 39B with water molecules to form hydroxyl ions. Any unabsorbed oxygen and other gases in the feed (e.g. nitrogen, carbon dioxide, etc.) or water vapor in the oxygen supply are vented through the oxygen outlet 15.

The foregoing is provided for purposes of explaining and disclosing preferred embodiments of the present invention. Modifications and adaptations to the described embodiments, particularly involving changes to the shape of the fuel cell, the type of hydrogen storage alloy, the cathode active material, the shape and design of the electrodes within the fuel cell, and the shape and design of the electrode flow channels, will be apparent to those skilled in the art. These changes and others may be made without departing from the scope or spirit of the invention in the following claims.

What is claimed is:

1. A fuel cell comprising:
   at least one hydrogen electrode pair in contact with a hydrogen stream;
   at lease one oxygen electrode pair in contact with an oxygen containing stream;
   at least one electrolyte chamber, wherein said electrolyte chamber provides mechanical support within said fuel cell and provides a pathway for an electrolyte solution to contact said hydrogen electrode pair and said oxygen electrode pair; and
   at least one compression plate.

2. The fuel cell according to claim 1, wherein said electrolyte chamber comprises a porous support structure disposed between a pair of membranes.

3. The fuel cell according to claim 2, wherein said porous support structure is comprised of an expanded polymer sheet.

4. The fuel cell according to claim 3, wherein said expanded polymer sheet is comprised of a polyolefin.

5. The fuel cell according to claim 2, wherein said electrolyte chamber contacts an electrolyte contacting surface of said hydrogen electrode pair and said oxygen electrode pair.

6. The fuel cell according to claim 5, wherein said pair of membranes prevent excess electrolyte solution from contacting said hydrogen electrode pair and said oxygen electrode pair.

7. The fuel cell according to claim 5, wherein said pair of membranes prevent said oxygen containing stream and said hydrogen stream from penetrating into said electrolyte solution.

8. The fuel cell according to claim 1, wherein said hydrogen electrode pair comprises an anode active material having hydrogen storage capacity.

9. The fuel cell according to claim 8, wherein at least one of the hydrogen electrodes of said hydrogen electrode pair have a hydrogen contacting surface, an electrolyte contacting surface, and a bulk of said active anode material.

10. The fuel cell according to claim 9, wherein said bulk of said anode active material is disposed between said hydrogen contacting surface and said electrolyte contacting surface.

11. The fuel cell according to claim 9, wherein said hydrogen contacting surface is adapted to dissociate and absorb gaseous hydrogen.

12. The fuel cell according to claim 11, wherein said bulk of said anode active material is adapted to store said absorbed hydrogen.

13. The fuel cell according to claim 12, wherein said electrolyte contacting surface is adapted to react said stored hydrogen with said electrolyte solution.

14. The fuel cell according to claim 9, wherein at least one of the hydrogen electrodes of said hydrogen electrode pair have a plurality of channels depressed into said hydrogen contacting surface.

15. The fuel cell according to claim 14, wherein said channels extend vertically and horizontally across said hydrogen contacting surface.

16. The fuel cell according to claim 15, wherein said hydrogen contacting surfaces of the hydrogen electrodes of said hydrogen electrode pair are adjacently disposed and said plurality of channels line up to form a series of hydrogen flow channels between the hydrogen electrodes of said hydrogen electrode pair.

17. The fuel cell according to claim 16, wherein the hydrogen electrodes of said hydrogen electrode pair have a distribution channel on said hydrogen contacting surface extending vertically along opposing edges of each of the hydrogen electrodes.

18. The fuel cell according to claim 17, wherein said distribution channels form a manifold when said hydrogen contacting surfaces of the hydrogen electrodes of said hydrogen electrode pair are adjacently disposed.

19. The fuel cell according to claim 18, wherein said distribution channels have a conductive backing.

20. The fuel cell according to claim 19, wherein said conductive backing is nickel.

21. The fuel cell according to claim 19, wherein said conductive backing is adapted to collect an electrical current.

22. The fuel cell according to claim 21, wherein said conductive backing is electrically connected to said anode active material.

23. The fuel cell according to claim 18, wherein said manifold distributes hydrogen to said series of hydrogen flow channels.

24. The fuel cell according to claim 9, wherein a porous sheet is disposed between said hydrogen contacting surfaces of the hydrogen electrodes of said hydrogen electrode pair, wherein said porous sheet is adapted to allow a stream of hydrogen to flow across said hydrogen contacting surfaces of the hydrogen electrodes while maintaining mechanical support within said fuel cell.

25. The fuel cell according to claim 1, wherein at least one of the hydrogen electrodes of said hydrogen electrode pair comprise an anode active material layer, a porous polytetrafluoroethylene layer, and a current collector grid.

26. The fuel cell according to claim 25, wherein said anode active material layer is disposed between said current collector grid and said polytetrafluoroethylene layer.

27. The fuel cell according to claim 26, wherein said anode active material layer is dispersed throughout said current collector grid.

28. The fuel cell according to claim 25, wherein said anode active material layer comprises a mixture of mischmetal nickel alloy, raney nickel, graphite, and polytetrafluoroethylene powder.

29. The fuel cell according to claim 28, wherein said anode active material layer has the following composition:
   35 weight percent mischmetal nickel alloy,
   46 weight percent raney nickel,
   4 weight percent graphite, and
   15 weight percent polytetrafluoroethylene powder.

30. The fuel cell according to claim 25, wherein said current collector grid comprises at least one selected from the group consisting of mesh, grid, matte, expanded metal, foil, foam and plate.

31. The fuel cell according to claim 30, wherein said current collector grid is comprised of a conductive metal.

32. The fuel cell according to claim 31, wherein said conductive metal is nickel.

33. The fuel cell according to claim 1, wherein said oxygen electrode pair comprises a cathode active material.

34. The fuel cell according to claim 33, wherein at least one of the oxygen electrodes of said oxygen electrode pair have an oxygen contacting surface, an electrolyte contacting surface, and a bulk of said cathode active material.

35. The fuel cell according to claim 34, wherein said bulk of said cathode active material is disposed between said oxygen contacting surface and said electrolyte contacting surface.

36. The fuel cell according to claim 34, wherein said oxygen contacting surface is adapted to dissociate and absorb gaseous oxygen.

37. The fuel cell according to claim 36, wherein said bulk of said cathode active material is adapted to store said absorbed oxygen.

38. The fuel cell according to claim 37, wherein said electrolyte contacting surface is adapted to react said stored oxygen with said electrolyte solution.

39. The fuel cell according to claim 38, wherein the oxygen electrodes of said oxygen electrode pair have a plurality of channels having a wave configuration depressed into said oxygen contacting surface.

40. The fuel cell according to claim 39, wherein said oxygen contacting surfaces of the oxygen electrodes of said oxygen electrode pair are adjacently disposed and said plurality of channels line up to form a series of oxygen flow channels between said oxygen contacting surfaces of the oxygen electrodes.

41. The fuel cell according to claim 40, wherein the oxygen electrodes of said oxygen electrode pair have a distribution channel on said oxygen contacting surface extending vertically along opposing edges of the oxygen electrodes.

42. The fuel cell according to claim 41, wherein said distribution channels form a manifold when said oxygen contacting surfaces of the oxygen electrodes of said oxygen electrode pair are adjacently disposed.

43. The fuel cell according to claim 42, wherein said distribution channels have a conductive backing.

44. The fuel cell according to claim 43, wherein said conductive backing is nickel.

45. The fuel cell according to claim 43, wherein said conductive backing is adapted to collect an electrical current.

46. The fuel cell according to claim 45, wherein said conductive backing is electrically connected to said cathode active material.

47. The fuel cell according to claim 42, wherein said manifold distributes oxygen to said series of oxygen flow channels.

48. The fuel cell according to claim 38, wherein a porous sheet is disposed between said oxygen contacting surfaces of the oxygen electrodes of said oxygen electrode pair, wherein said porous sheet is adapted to allow a stream of oxygen to flow across said oxygen contacting surfaces of the oxygen electrodes while maintaining mechanical support within said fuel cell.

49. The fuel cell according to claim 33, wherein at least one of the oxygen electrodes of said oxygen electrode pair comprise a gas diffusion layer, a catalyst layer, a polytetrafluoroethylene layer, and a current collector grid.

50. The fuel cell according to claim 49, wherein said catalyst layer is disposed between said gas diffusion layer and said current collector grid.

51. The fuel cell according to claim 49, wherein said gas diffusion layer is disposed between said catalyst layer and said polytetrafluoroethylene layer.

52. The fuel cell according to claim 49, wherein said polytetrafluoroethylene layer is in intimate contact with said oxygen containing stream.

53. The fuel cell according to claim 49, wherein said catalyst layer is dispersed throughout said current collector grid.

54. The fuel cell according to claim 49, wherein said current collector grid is in intimate contact with an electrolyte stream.

55. The fuel cell according to claim 49, wherein said current collector comprises at least one selected from the group consisting of mesh, grid, matte, expanded metal, foil, foam and plate.

56. The fuel cell according to claim 55, wherein said current collector grid is comprised of nickel.

57. The fuel cell according to claim 49, wherein said gas diffusion layer has the following composition:
- 40 weight percent polytetrafluoroethylene;
- 60 weight percent carbon black.

58. The fuel cell according to claim 49, wherein said catalyst layer has the following composition:
- 50 weight percent of a mixture by weight of 40 percent polytetrafluoroethylene and 60 percent carbon black,
- 15 weight percent carbon black;
- 15 weight percent graphite;
- 20 weight percent silver oxide.

59. The fuel cell according to claim 58, wherein said silver oxide includes a lithium aluminum alloy.

60. The fuel cell according to claim 58, wherein said silver oxide includes gallium.

61. The fuel cell according to claim 1, wherein said compression plate is adapted to absorb expansion of said hydrogen electrode pair and said oxygen electrode pair.

62. The fuel cell according to claim 61, wherein said compression plate provides mechanical support within said fuel cell.

63. The fuel cell according to claim 62, wherein said compression plate is comprised of rubber.

64. The fuel cell according to claim 1, wherein said electrolyte solution is comprised of a potassium hydroxide solution.

65. The fuel cell according to claim 1, wherein said oxygen containing stream comprises air.

66. The fuel cell according to claim 1, wherein said hydrogen stream comprises gaseous hydrogen.

* * * * *